US008743132B2

(12) United States Patent
Minami

(10) Patent No.: US 8,743,132 B2
(45) Date of Patent: Jun. 3, 2014

(54) SETTING CONTROL APPARATUS AND METHOD FOR OPERATING SETTING CONTROL APPARATUS

(75) Inventor: Nobuhiro Minami, Osaka (JP)

(73) Assignee: MegaChips Corporation, Osaka-shi (JP)

(*) Notice: Subject to any disclaimer, the term of this patent is extended or adjusted under 35 U.S.C. 154(b) by 226 days.

(21) Appl. No.: 12/967,783

(22) Filed: Dec. 14, 2010

(65) Prior Publication Data

US 2011/0161574 A1 Jun. 30, 2011

(30) Foreign Application Priority Data

Dec. 24, 2009 (JP) ................................ 2009-292896

(51) Int. Cl.
*G06F 13/00* (2006.01)
*G06F 12/00* (2006.01)

(52) U.S. Cl.
USPC ............................ 345/537; 711/104; 711/154

(58) Field of Classification Search
USPC .......................................................... 345/531
See application file for complete search history.

(56) References Cited

U.S. PATENT DOCUMENTS

| | | | | |
|---|---|---|---|---|
| 6,654,305 | B2 * | 11/2003 | Tsunoda et al. | 365/226 |
| 7,512,021 | B2 | 3/2009 | Houda et al. | |
| 7,969,793 | B2 * | 6/2011 | Houda et al. | 365/189.05 |
| 2009/0160973 | A1 | 6/2009 | Houda et al. | |

FOREIGN PATENT DOCUMENTS

| | | |
|---|---|---|
| JP | 62-75586 | 4/1987 |
| JP | 63-29793 | 2/1988 |
| JP | H05-197359 | 8/1993 |
| JP | 2002-108268 | 4/2002 |
| JP | 2002-304167 | 10/2002 |
| JP | 2006-337989 | 12/2006 |
| JP | 2009-37074 | 2/2009 |

OTHER PUBLICATIONS

Japanese Office Action dated Apr. 23, 2011 issued Apr. 17, 2013 in Japanese Appln No. JP2009-292896 (with partial English translation).

Office Action issued Nov. 6, 2013, in Japanese Patent Application No. 2009-292896, filed Dec. 24, 2009, (w/English translation), pp. 1-5.

* cited by examiner

*Primary Examiner* — Ke Xiao
*Assistant Examiner* — Kwang Lee
(74) *Attorney, Agent, or Firm* — Oblon, Spivak, McClelland, Maier & Neustadt, L.L.P.

(57) ABSTRACT

A setting control apparatus includes a setting control part, a special register, and a read-out control part. The setting control part makes stored in a temporary storage part a control value used in a processing circuit, in response to an input of the control value. The special register is electrically connected to the processing circuit and serving as a storage element capable of storing the control value. The read-out control part controls a read-out operation for reading out the control value from the temporary storage part into the special register. The read-out control part performs the read-out operation at a predetermined timing after storing of the control value in the temporary storage part is completed.

11 Claims, 3 Drawing Sheets

SETTING CONTROL APPARATUS AND METHOD FOR OPERATING SETTING CONTROL APPARATUS

BACKGROUND OF THE INVENTION

1. Field of the Invention

The present invention relates to a technique of storage in a storage element.

2. Description of the Background Art

In a predetermined apparatus such as a display apparatus or an image pickup apparatus, control values used for an operation or a process (an operation and the like) are stored in a plurality of storage elements within the predetermined apparatus, and the operation and the like are performed using the control values stored in the storage elements. In the predetermined apparatus, the control value is updated, in accordance with a progress of the operation or the process of the predetermined apparatus, or upon a request for change of the control value being made by an operator of the predetermined apparatus.

Changing the control value by updating in this manner may influence the operation and the like of the predetermined apparatus, to cause a trouble.

For example, in a display apparatus included in the predetermined apparatus, a display is made on a monitor based on a video signal, but updating the control value may influence the video image displayed on the monitor.

Therefore, for example, Japanese Patent Application Laid-Open No. 2006-337989 discloses a technique in which a control value (a set value in Japanese Patent Application Laid-Open No. 2006-337989) is temporarily held in a temporary storage part, and in a vertical blanking interval of a video signal, the control value is read out from the temporary storage part to update a control value held in a storage element (a register in Japanese Patent Application Laid-Open No. 2006-337989).

SUMMARY OF THE INVENTION

However, in Japanese Patent Application Laid-Open No. 2006-337989 mentioned above, if the control value is updated before setting of the control value in the temporary storage part is completed, the control value may be incorrectly set in the storage element.

Thus, the predetermined apparatus which realizes update of the control value within a particular time period such as the vertical blanking interval involves the possibility of incorrect setting of the control value.

Therefore, an object of the present invention is to provide a technique capable of reducing the possibility of incorrect setting of a control value in a storage element.

To achieve the above-mentioned problem, a setting control apparatus according to a first aspect of the present invention includes: a storage control part which makes stored in a first storage part a control value used in a predetermined processing part, in response to an input of the control value; a second storage part electrically connected to the predetermined processing part and capable of storing the control value therein; and a read-out control part which controls a read-out operation for reading out the control value from the first storage part into the second storage part. The read-out control part performs the read-out operation at a predetermined timing after storing of the control value in the first storage part is completed.

This can reduce the possibility of incorrect setting of the control value in the storage element.

According to a second aspect the present invention, in the setting control apparatus according to the first aspect, the storage control part includes a generation part which generates a storage completion signal indicating completion of storing of the control value into the first storage part, after storing of the control value in the first storage part is completed; the storage control part gives the storage completion signal to the read-out control part; and the read-out control part uses an input of the storage completion signal as a condition for starting execution of the read-out operation.

According to a third aspect of the present invention, in the setting control apparatus according to the first or second aspect, a video signal is included in a processing object to be processed in the predetermined processing part; and the predetermined timing is a timing included in a vertical blanking interval of the video signal.

According to a fourth aspect of the present invention, in the setting control apparatus according to any one of the first to third aspects, an SRAM is employed as the first storage part; the storage control part makes the control value stored in the SRAM, individually for each inputted control value.

According to a fifth aspect of the present invention, in the setting control apparatus according to any one of the first to fourth aspects, the setting control apparatus further includes a third storage part electrically connected to the predetermined processing part; a video signal is included in a processing object to be processed in the predetermined processing part; the storage control part makes a first control value stored in the third storage part, and makes a second control value stored in the first storage part, the first control value being one of the control values having no influence on the video signal, the second control value being one of the video signals having influence on the video signal; and the read-out control part executes a read-out operation concerning the second control value.

A method for operating a setting control apparatus according to the present invention includes the steps of (a) making stored in a first storage part a control value used in a predetermined processing part, in response to an input of the control value; and (b) reading out the control value from the first storage part, and making the control value stored in a second storage part electrically connected to the predetermined processing part. The step (b) is performed at a predetermined timing after the step (a) is completed.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a preferred embodiment of the present invention will be described with reference to the accompanying drawings.

1. Preferred Embodiment

[1-1. Outline of Configuration]

Figure 1:
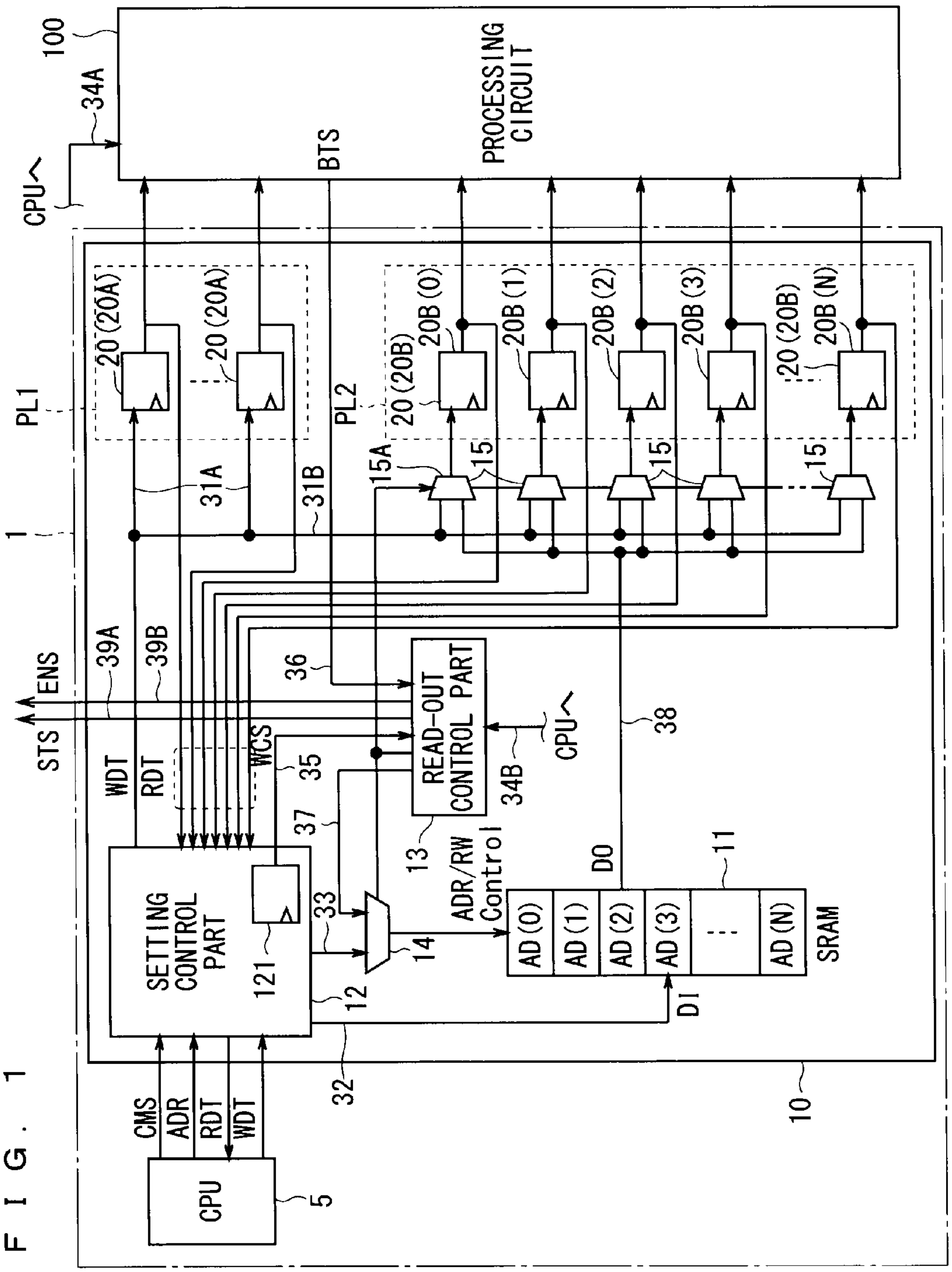
FIG. 1 is a block diagram showing a configuration of a setting control apparatus according to a preferred embodiment.

FIG. 1 is a block diagram showing a configuration of a setting control apparatus 1 according to this preferred embodiment.

The setting control apparatus 1 shown in FIG. 1 sets a control value in a storage element which holds a control value used for execution of a process in a predetermined processing circuit (hereinafter, also referred to simply as a "processing circuit") 100.

To be specific, as shown in FIG. 1, the setting control apparatus 1 includes a CPU5 and a CPU interface (IF) circuit 10.

The CPU5 outputs control information to the CPU IF circuit 10, to instruct setting and updating of the control value (also referred to as a "set value") held in the storage element within the CPU IF circuit 10. The control information includes a command signal CMS, an address signal ADR, and a data signal WDT. The command signal CMS instructs the CPU IF circuit 10 to perform a predetermined operation. The address signal ADR indicates an address of the storage element in which the control value is to be written. The data signal WDT indicates the control value to be written in the storage element.

The CPU IF circuit 10 performs an operation for setting the control value, in response to the instruction from the CPU5. More specifically, the CPU IF circuit 10 includes storage elements 20, a temporary storage part 11, a setting control part 12, a read-out control part 13, a first selector 14, and second selectors 15.

The storage element 20 is configured of a register, for example, and has a function to hold the control value therein. The register is electrically connected to the processing circuit 100, and the control value held in the register is used for execution of the process in the processing circuit 100 which is provided in an image display apparatus or an image pickup apparatus.

Such a register is provided for each control value, and the resisters are broadly classified into normal registers 20A and special registers 20B, in accordance with a type (property) of the control value held therein. More specifically, a control value having no influence on a display image in the image display apparatus or an image signal obtained by the image pickup apparatus is held in the normal register 20A. On the other hand, a control value having influence on the display image in the image display apparatus or the image signal obtained by the image pickup apparatus is held in the special register 20B. In FIG. 1, the normal registers 20A form a first register group enclosed with a dotted line PL1, and the special registers 20B form a second register group enclosed with a dotted line PL2.

The temporary storage part 11 has a function to temporarily hold therein a control value to be held in the special register 20B, that is, a control value having influence on the display image or the image signal, prior to setting the control value in the special register 20B. For example, an SRAM (Static Random Access Memory) is employed as the temporary storage part 11.

In the special register 20B and the temporary storage part 11, a storage location (saving location) corresponding to each type of the control value is set, and the storage location of the special register 20B and the storage location of the temporary storage part 11 are associated with each other in accordance with the type of the control value. Thus, a certain control value is stored in a predetermined address of the temporary storage part 11, and then stored in a special register 20B associated with this predetermined address. For example, a control value stored in an address AD(0) of the temporary storage part 11 is set in a special register 20B(0), and a control value stored in an address AD(N) is set in a special register 20B(N).

The temporary storage part 11 and the special register 20B are sometimes collectively referred to as a double-buffer register, because they perform the storing of a control value in two stages when setting the control value.

The setting control part 12 functions as storage control means for setting a control value in the temporary storage part 11 or the storage element 20 based on the control information inputted from the CPU5. The setting control part 12 obtains a current control value set in each storage element 20, and outputs a data signal RDT indicating the current control value to the CPU5.

The read-out control part 13 performs a switching control on the first selector 14 and the second selector 15, to control a read-out operation (also referred to as a "control value read-out operation" or a "control value update operation") for reading out the control value stored in the temporary storage part 11 and updating the control value of the special register 20B. The first selector 14 and the second selector 15 select a transmission path (transmission channel) by the read-out control part 13, but normally, a transmission path corresponding to a signal from the setting control part 12 is ensured.

The processing circuit 100 is a processing circuit which executes a predetermined process concerning a video signal in an image pickup apparatus, an image processing apparatus, an image display apparatus, and the like. Examples of the processing circuit 100 include an image processing circuit and a display control circuit. That is, a predetermined apparatus such as the image pickup apparatus, the image processing apparatus, and the image display apparatus is represented as a setting control apparatus, from the viewpoint that the predetermined apparatus sets in the storage element the control value used for execution of the predetermined process.

[1-2. Operation]

Next, an operation of the setting control apparatus 1 will be described. The operation of the setting control apparatus 1 is divided into a stage (also referred to as an "initial setting stage") of initially setting a control value in the register and a stage (also referred to as an "update setting stage") of updating the control value in the register after the initial setting.

Figure 2:
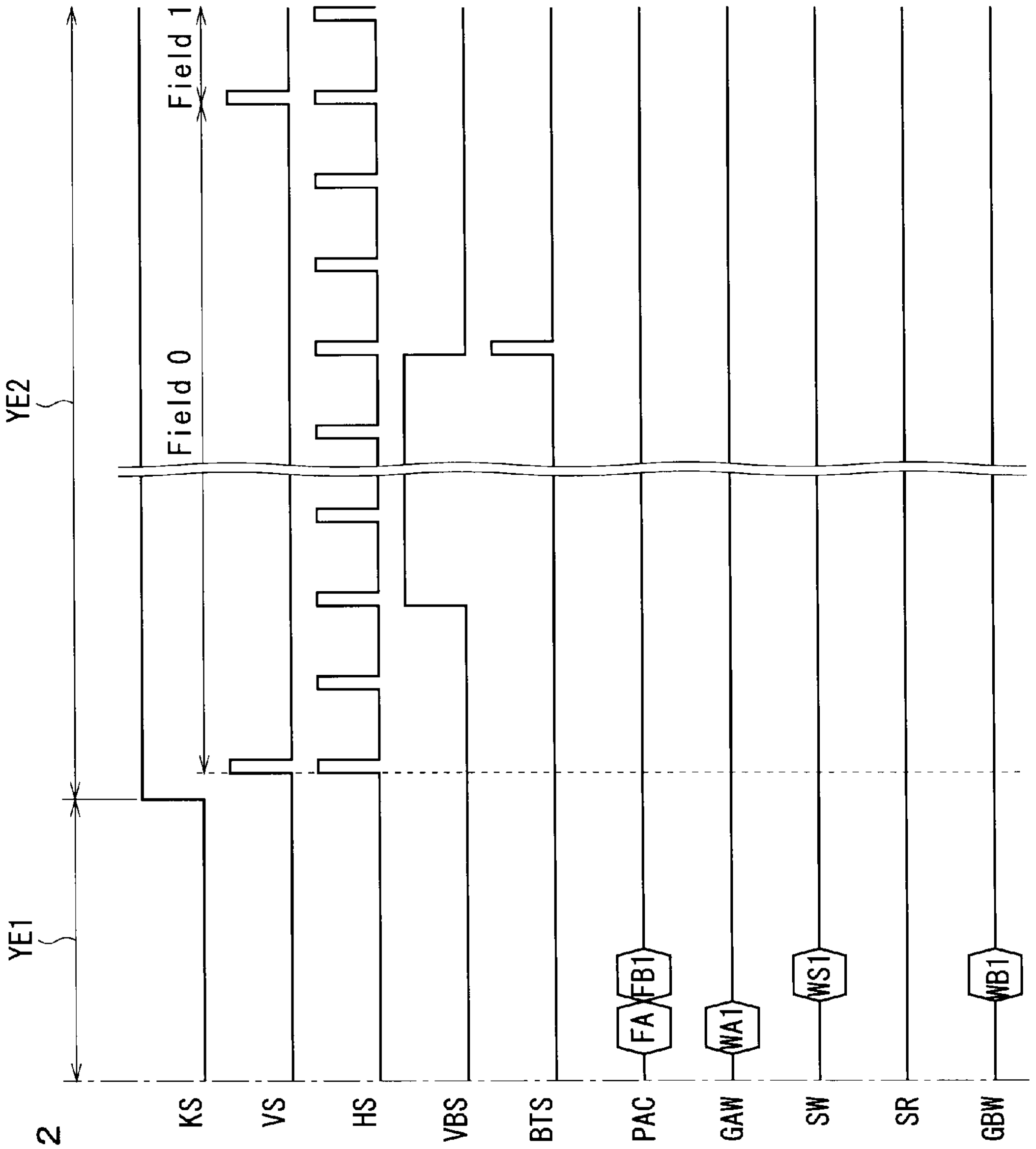
FIG. 2 is a timing chart showing an operation of the setting control apparatus at an initial setting stage.

Firstly, the operation of the setting control apparatus 1 at the initial setting stage will be described in detail. FIG. 2 is a timing chart showing the operation of the setting control apparatus 1 at the initial setting stage. FIG. 2 shows a signal KS indicating a state of the operation of the processing circuit 100, a vertical synchronization signal VS in the processing circuit 100, a horizontal synchronization signal HS in the processing circuit 100, a signal VBS indicating a vertical blanking interval in the processing circuit 100, and a signal (also referred to as a "V-start signal") BTS corresponding to a start of the vertical blanking interval. FIG. 2 also shows a state PAC of access from the CPU5, a state GAW of an operation for writing data (here, the control value) into the normal register 20A, a state SW of an operation for writing data into the temporary storage part 11, a state SR of an operation for reading out data from the temporary storage part 11, and a state GBW of an operation for writing data into the special register 20B, with these states corresponding to the progresses of the respective signals KS, VS, HS, VBS, and BTS over time.

The initial setting stage is started upon power-on of the predetermined apparatus or the like, and in FIG. 2, the time period indicated by the arrow YE1 is the initial setting stage.

In the initial setting stage, the control information for initial setting is inputted from the CPU5 to the CPU IF circuit 10.

To be more specific, as shown in FIG. 2, when control information FA containing an instruction to write a control value into each normal register 20A is inputted from the CPU5, the setting control part 12 causes the normal register 20A to perform an operation WA1 for writing this control value. In this writing operation WA1, the control value is inputted to each normal register 20A via a data line 31A, and the control value as an initial value is set in each normal register 20A.

Then, when control information FB1 containing an instruction to write a control value into each special register 20B is inputted from the CPU5, the setting control part 12 causes the special register 20B to perform an operation WB1 for writing this control value. In this writing operation WB1, the control value is inputted to each special register 20B via a data line 31B, and the control value as an initial value is set in each special register 20B.

In response to the input of the control information FB1 from the CPU5, the setting control part 12 also causes the temporary storage part 11 to perform an operation WS1 for writing the control value. In more detail, the setting control part 12 inputs the control value to the temporary storage part 11 via a data line 32, and additionally inputs a writing control signal instructing writing and a predetermined address in which this control value is to be stored, to the temporary storage part 11 via a signal line 33, so that the control value is stored in the predetermined address of the temporary storage part 11.

After such a process for setting the initial values in the respective registers 20A, 20B and the temporary storage part 11, the CPU5 inputs a boot signal to the processing circuit 100 via a signal line 34A, to boot the processing circuit 100. The signal KS indicating the state of the operation of the processing circuit 100 makes transition to the HIGH level, and the operation stage of the setting control apparatus 1 shifts from the initial setting stage to the update setting stage. In FIG. 2, the time period indicated by the arrow YE2 is the update setting stage.

In FIG. 1, the data lines 31A and 31B from the setting control part 12 to the respective registers 20A and 20B are partly collectively illustrated as a single line. However, in detail, the data lines 31A and 31B each corresponding to each of the registers 20A and 20B are provided.

Figure 3:
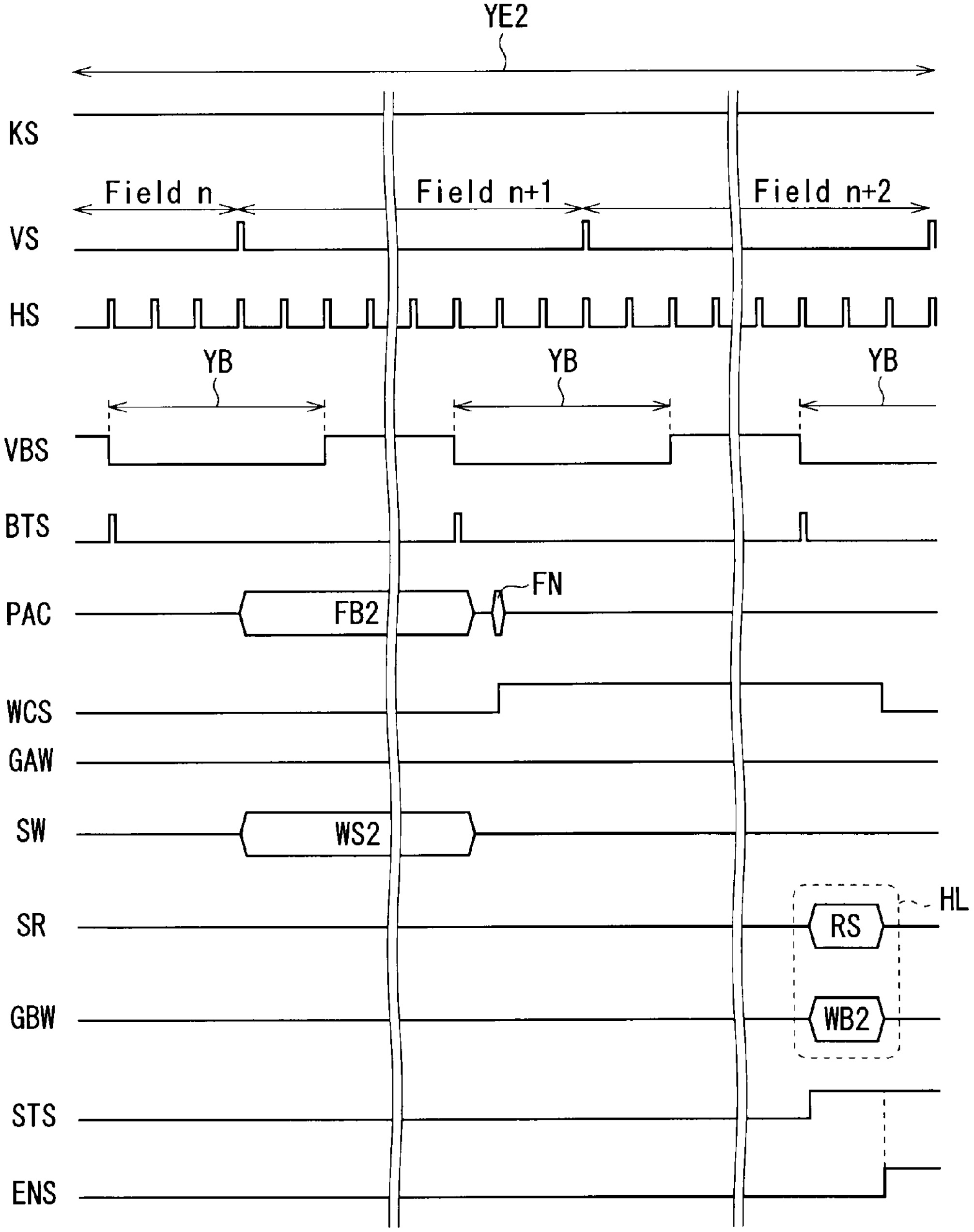
FIG. 3 is a timing chart showing an operation of the setting control apparatus at an update setting stage.

Next, a detailed description will be given of the update setting stage. FIG. 3 is a timing chart showing the operation of the setting control apparatus 1 at the update setting stage. FIG. 3 shows a signal KS indicating a state of the operation of the processing circuit 100, a vertical synchronization signal VS in the processing circuit 100, a horizontal synchronization signal HS in the processing circuit 100, a signal VBS indicating a vertical blanking interval in the processing circuit 100, a signal (V-start signal) BTS corresponding to a start of the vertical blanking interval and inputted from the processing circuit 100, and a signal (also referred to as a "writing completion signal" or a "storage completion signal") WCS indicating completion of writing of the control value into the temporary storage part 11. FIG. 3 also shows a state PAC of access from the CPU5, a state GAW of an operation for writing data (here, the control value) into the normal register 20A, a state SW of an operation for writing data into the temporary storage part 11, a state SR of an operation for reading out data from the temporary storage part 11, and a state GBW of an operation for writing data into the special register 20B, with these states corresponding to the progresses of the respective signals KS, VS, HS, VBS, BTS, and WCS over time. Additionally, FIG. 3 also shows a signal (read-out start signal) STS indicating a start of read-out of data from the temporary storage part 11, and a signal (read-out end signal) ENS indicating an end of read-out of data from the temporary storage part 11.

The signal VBS indicating the vertical blanking interval of the video signal processed in the processing circuit 100 is generated based on the horizontal synchronization signal HS and the vertical synchronization signal VS, and a zone of the signal VBS where a signal level is low (LOW), which is indicated by the arrow YB, corresponds to the vertical blanking interval of the video signal. For example, in the image display apparatus, the vertical blanking interval is also referred to as a non-display interval in which a valid image is not displayed, and in the image pickup apparatus, the vertical blanking interval is also referred to as an interval (invalid data interval) in which a valid video signal is not obtained from an imaging element in the image pickup apparatus.

In the update setting stage, a predetermined process concerning the video signal is executed in the processing circuit 100. Therefore, in the setting control apparatus 1, different update operations are performed between a case of updating the control value having no influence on the video signal and a case of updating the control value having influence on the video signal.

More specifically, when a request for updating the control value having no influence on the video signal, that is, the control value held in the normal register 20A, occurs, the setting control part 12 inputs the control value to the normal register 20A via the data line 31A, to cause the normal register 20A to perform the operation for updating the control value. In this manner, the update of the control value having no influence on the video signal is performed by the setting control part 12.

On the other hand, when a request for updating the control value having influence on the video signal, that is, the control value held in the special register 20B, occurs, the setting control part 12 performs an operation for updating the control value by using the double-buffer register.

In more detail, firstly, when the control information FB2 containing the instruction to write the control value into each special register 20B is inputted from the CPU5, the setting control part 12 causes the temporary storage part 11 to perform the operation WS2 for writing this control value. In this writing operation WS2, the control value is inputted to the temporary storage part 11 via the data line 32, and additionally an address in which this control value is to be stored is inputted to the temporary storage part 11 via the signal line 33, so that the control value is stored in the predetermined address within the temporary storage part 11.

After the operation WS2 for writing the control value into the temporary storage part 11 is completed, the CPU5 outputs control information FN containing a signal indicating that transmission of the control information FB2 ends. The signal included in the control information FN outputted from the CPU5 serves as a command signal for making transition of the signal level of the writing completion signal WCS indicating completion of writing of the control value into the temporary storage part 11, to the HIGH level. More specifically, the setting control part 12 which receives the control information FN makes a predetermined value stored in a flag register 121 within the setting control part 12, to set a flag. The flag register 121 functions as generation means for generating the writing completion signal WCS, shown in FIG. 3, indicating completion of writing of the control value into the temporary storage part 11. After the flag is set in the flag register 121, the signal level of this writing completion signal WCS make transition to the HIGH level.

In the setting control apparatus 1, after the writing completion signal WCS is set to the HIGH level, a control value read-out operation is started in response to detection of a trigger signal (read-out trigger signal) for read-out.

More specifically, the control value read-out operation is performed under control of the read-out control part 13, and the condition for the read-out control part 13 to start the control value read-out operation is the fact that the HIGH level state of the writing completion signal WCS and the HIGH level state of the read-out trigger signal are simultaneously detected. When this starting condition is satisfied, the read-out control part 13 starts the operation for reading out the control value. In FIG. 3, the control value read-out operation is an operation indicated as a part enclosed with the broken line HL. The control value read-out operation includes a read-out operation RS for reading out the control value from the temporary storage part 11, and a writing operation WB2 for storing this control value in the special register 20B.

The control value read-out operation will be described in more detail. The read-out control part 13 is booted in response to the boot signal for the processing circuit 100 which is inputted from the CPU5 via a signal line 34B. When the writing completion signal WCS at the HIGH level is inputted to the read-out control part 13 via a signal line 35 and additionally the read-out trigger signal is inputted to the read-out control part 13 from the processing circuit 100 via a signal line 36, the read-out control part 13 starts the control value read-out operation.

In the control value read-out operation, the read-out control part 13 switches the first selector 14 so that a transmission path from a signal line 37 to the temporary storage part 11 is ensured, and the read-out control part 13 also designates via a signal line 37 an address (also referred to as a "read-out address") from which the control value is to be read out. The designation of the read-out address is performed by outputting to the temporary storage part 11 a read-out control signal instructing read-out and a read-out address indicating an address which stores therein the control value to be read out.

In the temporary storage part 11 to which the read-out control signal and the read-out address are inputted, the control value stored in the designated read-out address is outputted. The control value outputted from the temporary storage part 11 is inputted to each second selector 15 via a data line 38. Here, the read-out control part 13 performs the switching control on the second selector 15, to make the control value read out stored into a special register 20B associated with the read-out address. For example, in FIG. 1, in a case of reading out the control value stored in the address AD(0) of the temporary storage part 11, the read-out control part 13 performs the switching control on the second selector 15A to ensure the transmission path to the special register 20B(0) corresponding to the address AD(0), and makes the read-out control value stored in the special register 208(0).

In this manner, the read-out control part 13 performs a process of reading out from the temporary storage part 11 for each control value, and performs the switching control on the second selector 15 in accordance with the type of the read-out control value, to thereby select the special register 20B in which the control value is to be changed, thus realizing update of the control value.

In the setting control apparatus 1, in response to the start of the control value read-out operation, the read-out start signal STS is outputted from the read-out control part 13 to the CPU5 via a signal line 39A. Also, in response to completion of the control value read-out operation, the read-out end signal ENS is outputted from the read-out control part 13 to the CPU5 via a signal line 39B. The signals STS and ENS serve to inform the CPU5 of the state of execution of the control value read-out operation. In the CPU5, for example, these signals STS and ENS can be used for limiting the instruction for writing into the special register 20B during execution of the control value read-out operation.

In this preferred embodiment, the V-start signal BTS is adopted as the read-out trigger signal for starting the control value read-out operation, and one of the conditions for starting execution of the control value read-out operation is detection of the HIGH level state of the V-start signal BTS.

In this manner, the control value read-out operation is started in response to detection of the V-start signal BTS which corresponds to the start of the vertical blanking interval, and thereby the control value can be updated in the vertical blanking interval. This can realize the update of the control value without influencing the video signal which is a processing object to be processed in the processing circuit 100.

Moreover, in this preferred embodiment, the writing completion signal WCS indicating completion of writing of the control value into the temporary storage part 11 is inputted to the read-out control part 13, and the HIGH level state of the writing completion signal WCS serves as one of the conditions for starting execution of the control value read-out operation. Thereby, the control value read-out operation is performed after writing of the control value into the temporary storage part 11 is completed, which can reduce the possibility that the control value is read out from the temporary storage part 11 while writing of the control value into the temporary storage part 11 is not completed. Therefore, in the setting control apparatus 1 of this preferred embodiment, incorrect setting of the control value in the special register 20B can be prevented.

As described above, the setting control apparatus 1 includes the setting control part 12 which makes a control value used in the processing circuit 100 stored in the temporary storage part 11 in response to an input of the control value, the special registers 20B electrically connected to the processing circuit 100 and serving as storage elements capable of storing the control value, and the read-out control part 13 which controls the read-out operation for reading out the control value from the temporary storage part 11 into the special register 20B. The read-out control part 13 performs the read-out operation at a predetermined timing included in the vertical blanking interval after storing of the control value in the temporary storage part 11 is completed. This can reduce the possibility of incorrect setting of the control value, because the read-out operation for reading out the control value into the storage element is performed after storing of the control value in the temporary storage part 11 is completed.

Although in the above description, the case where the SRAM is employed as the temporary storage part 11 is shown as an example, the SRAM can freely designate a memory cell constituting the SRAM, and perform reading and writing. Accordingly, in the case of this preferred embodiment where the SRAM is employed as the temporary storage part 11, the setting control part 12 can individually change each of the control values held in the temporary storage part 11, which can shorten a time required for the control value update operation.

2. Modification

Although a preferred embodiment of the present invention has been described above, the present invention is not limited to the above-described preferred embodiment.

For example, although in the preferred embodiment described above, the horizontal synchronization signal HS and the vertical synchronization signal VS are obtained from the processing circuit 100, this is not limitative. More specifically, it may be acceptable that an HV counter which generates the horizontal synchronization signal HS and the vertical synchronization signal VS is provided in the setting control apparatus 1, so that the horizontal synchronization signal HS and the vertical synchronization signal VS are obtained from the HV counter within the setting control apparatus 1. Thereby, the signal VBS indicating the vertical blanking interval of the video signal can be generated in the setting control apparatus 1, and the control value read-out operation can be controlled using this signal VBS. Adoption of such a configuration is effective in a case where the signal VBS inputted from the processing circuit 100 lags behind the actual vertical blanking interval.

Although in the preferred embodiment described above, the control value read-out operation is started in response to detection of the V-start signal BTS which corresponds to the start of the vertical blanking interval, this is not limitative. The control value read-out operation may be started at a predetermined timing included in the vertical blanking interval. However, this predetermined timing (a timing for starting the control value read-out operation) is required to be a timing that allows the control value read-out operation to be completed within the vertical blanking interval in which the control value read-out operation is started.

Although in the setting control apparatus 1 of the preferred embodiment described above, the control value is updated in the vertical blanking interval of the video signal, this is not limitative. The setting control apparatus 1 is also applicable to a case where the update of the control value is realized within a predetermined interval other than the vertical blanking interval.

While the invention has been shown and described in detail, the foregoing description is in all aspects illustrative and not restrictive. It is therefore understood that numerous modifications and variations can be devised without departing from the scope of the invention.

What is claimed is:

1. A setting control apparatus comprising:

a first storage part capable of storing a control value used in a predetermined processing part therein;

a second storage part electrically connected to said predetermined processing part and capable of storing said control value therein;

a storage control part which causes storing, in response to an input of an initial value of said control value, in said second storage part, of said initial value, and causes storing, in response to an input of an updated value of said control value, in said first storage part, of said updated value; and a read-out control part which controls a read-out operation for reading out said updated value of said control value from said first storage part into said second storage part, wherein said read-out control part performs said read-out operation at a predetermined timing after storing of said updated value of said control value in said first storage part is completed, a video signal is included in a processing object to be processed in said predetermined processing part, said predetermined timing is a timing included in a vertical blanking interval of said video signal, said storage control part communicates said updated value of said control value to said first storage part via a first data line, and communicates a storing instruction via a first signal line, which is different from said first data line, via a first transmission path selected by a first selector, said read-out control part controls said read-out operation by controlling said first selector to select a second transmission path, which is different from said first transmission path, between said read-out control part and said first storage part and by communicating a read-out instruction via a second signal line, which is different from said first data line and said first signal line, via said second transmission path to said first storage part, said first storage part is connected to said second storage part via a second selector, said second selector being controlled by said read-out control part, said first storage part is connected to said predetermined processing part via said second selector and said second storage part, said storage control part directly communicates with said first storage part via said first data line, directly communicates with said second storage part via a second data line, and directly communicates with a third storage part electrically connected to said predetermined processing part via a third data line, and said first data line, said second data line, and said third data line are different.

2. The setting control apparatus according to claim 1, wherein said storage control part includes a generation part which generates a storage completion signal indicating completion of storing of said updated value of said control value into said first storage part, after storing of said updated value of said control value in said first storage part is completed, said storage control part gives said storage completion signal to said read-out control part, and said read-out control part uses an input of said storage completion signal as a condition for starting execution of said read-out operation.

3. The setting control apparatus according to claim 1, wherein an SRAM is employed as said first storage part, and said storage control part makes said updated value of said control value stored in said SRAM, individually for each inputted control value.

4. The setting control apparatus according to claim 1, further comprising said third storage part, which is electrically connected to said predetermined processing part, wherein said updated value of said control value is stored in said third storage part when said updated value of said control value has no influence on said video signal, said updated value of said control value is stored in said first storage part when said updated value of said control value has an influence on said video signal, and said read-out control part executes a read-out operation concerning said updated value of said control value, when said updated value of said control value is stored in said first storage part.

5. A method for operating a setting control apparatus, comprising the steps of:

(a) causing storing, by a storage control part, in a first storage part of an updated value of a control value used in a predetermined processing part, in response to an input of said updated value;

(b) causing storing, by the storage control part, in response to an input of an initial value of said control value, in said second storage part electrically connected to said predetermined processing part, of said initial value before said step (a);

(c) reading out, by a read-out control part, said updated value of said control value from said first storage part, and making said updated value stored in a second storage part electrically connected to said predetermined processing part, wherein said step (c) is performed at a predetermined timing after said step (a) is completed, a video signal is included in a processing object to be processed in said predetermined processing part, and said predetermined timing is a timing included in a vertical blanking interval of said video signal;

(d) communicating, by said storage control part, said updated value of said control value to said first storage part via a first data line, and communicating a storing instruction via a first signal line, which is different from said first data line, via a first transmission path selected by a first selector, wherein said step (c) of reading out further includes controlling said first selector to select a second transmission path, which is different from said first transmission path, between said read-out control part and said first storage part and communicating a read-out instruction via a second signal line, which is different from said first data line and said first signal line, via said second transmission path to said first storage part, said first storage part being connected to said second storage part via a second selector, said second selector being controlled by said read-out control part, said first storage part being connected to said predetermined processing part via said second selector and said second storage part, said storage control part directly communicating with said first storage part via said first data line, directly communicating with said second storage part via a second data line, and directly communicating with a third storage part electrically connected to said predetermined processing part via a third data line, and said first data line, said second data line, and said third data line being different.

6. The method according to claim 5, further comprising: classifying said first storage part based on a type of said control value, the type of said control value specifying whether said control value has an influence on an image signal obtained by an image pickup apparatus.

7. The method according to claim 5, further comprising: classifying said first storage part based on a type of said control value, the type of said control value specifying whether said control value has an influence on a display image displayed by an image display apparatus.

8. The method according to claim 6, further comprising: classifying said second storage part based on the type of said control value.

9. The method according to claim 7, further comprising: classifying said second storage part based the type of said control value.

10. The setting control apparatus according to claim 1, wherein said storage control part is connected to said second storage part, and said storage control part is indirectly connected to said predetermined processing part.

11. The setting control apparatus according to claim 1, further comprising: the third storage part, said third storage part being directly electrically connected to said predetermined processing part.

* * * * *